UNITED STATES PATENT OFFICE.

JOSEPH GLATZ, OF BROOKLYN, NEW YORK.

PROCESS FOR THE MANUFACTURE OF CANDLE MATERIALS.

No. 819,646.     Specification of Letters Patent.     Patented May 1, 1906.

Application filed June 1, 1904. Serial No. 210,725.

*To all whom it may concern:*

Be it known that I, JOSEPH GLATZ, a citizen of the United States, residing at Brooklyn, in the county of Kings and State of New York, have invented certain new and useful Improvements in Processes for the Manufacture of Candle Materials; and I do hereby declare the following to be a full, clear, and exact description of the invention, such as will enable others skilled in the art to which it appertains to make and use the same.

My invention relates to improvements in processes for the production of candle materials, and more especially to processes for the production of candles from fats and fatty substances as distinguished from those made principally from paraffins, though my invention may also be applied in combination with these.

In the ordinary manufacture of candles from tallow, greases, palm-oil, or other mixed fats these fats are first saponified by steam under pressure or by acids or by other means by which the glycerids contained in said fats are separated into their respective acids and glycerin.

My process of producing new and useful candle materials consists in treating either these mixed fats or the fatty acids, either singly or a mixture of the same, with ammonia under pressure for a period of from two to twenty hours, whereby new and useful candle materials are produced.

It is immaterial in my process whether I start with the glycerids or fats or with the fatty acids. If the glycerids are treated with ammonia under pressure, the glycerin so produced is removed by distillation in a vacuum and the candle material remains. If the glycerin has already been removed from the fats used, the distillation can be dispensed with.

The melting-point of the resultant product can be regulated entirely by the time used in the treatment with ammonia. As the saponification of the fats and the complete liberation of the glycerin usually requires all of fifteen hours, I have found it more convenient in practice where a material of given melting-point is wanted to start with the fatty acids directly, as the undecomposed glycerid still remaining in the mixture of fats when same is treated for less than fifteen hours has a tendency to lower the melting-point of the product. By this treatment of fats, greases, palm-oil, and other fatty bodies I have found it possible to produce candle materials having melting-points from 68° centigrade upward.

In the process I use I do not confine myself to any particular fatty acids or fats to produce the candle materials mentioned, but depend solely upon the time of treatment with ammonia under pressure, this time varying from two to twenty hours, the pressure varying from two to fifty atmospheres, though I find a pressure of fifteen atmospheres at a temperature varying from 150° centigrade to 250° centigrade most convenient in practice, although I expressly do not confine myself to the temperatures herein given.

Tallow, palm-oil, olive-oil, waste greases, and other fats will give the materials herein mentioned.

Having thus fully described my process, what I claim as my invention, and desire to secure by Letters Patent, is as follows:

1. The process of producing a composition of matter by the treatment of fats or fatty acids with ammonia under a pressure of from ten to fifty atmospheres for a period of two to twenty hours.

2. The process of producing a composition of matter by the treatment of fats or fatty acids with ammonia under a pressure of from ten to fifty atmospheres for a period of two to twenty hours and at a temperature varying between 150° centigrade and 250° centigrade.

3. The process of producing a composition of matter by the treatment of fats or fatty acids with ammonia under pressure of from ten to fifty atmospheres.

In testimony whereof I affix my signature in presence of two witnesses.

JOSEPH GLATZ.

Witnesses:
    HUGO MOCK,
    ROBT. H. HIBBARD.